March 24, 1970  E. COATS  3,502,157
UNIVERSAL MOUNTING FOR TOOLS
Filed Aug. 8, 1967  2 Sheets-Sheet 1
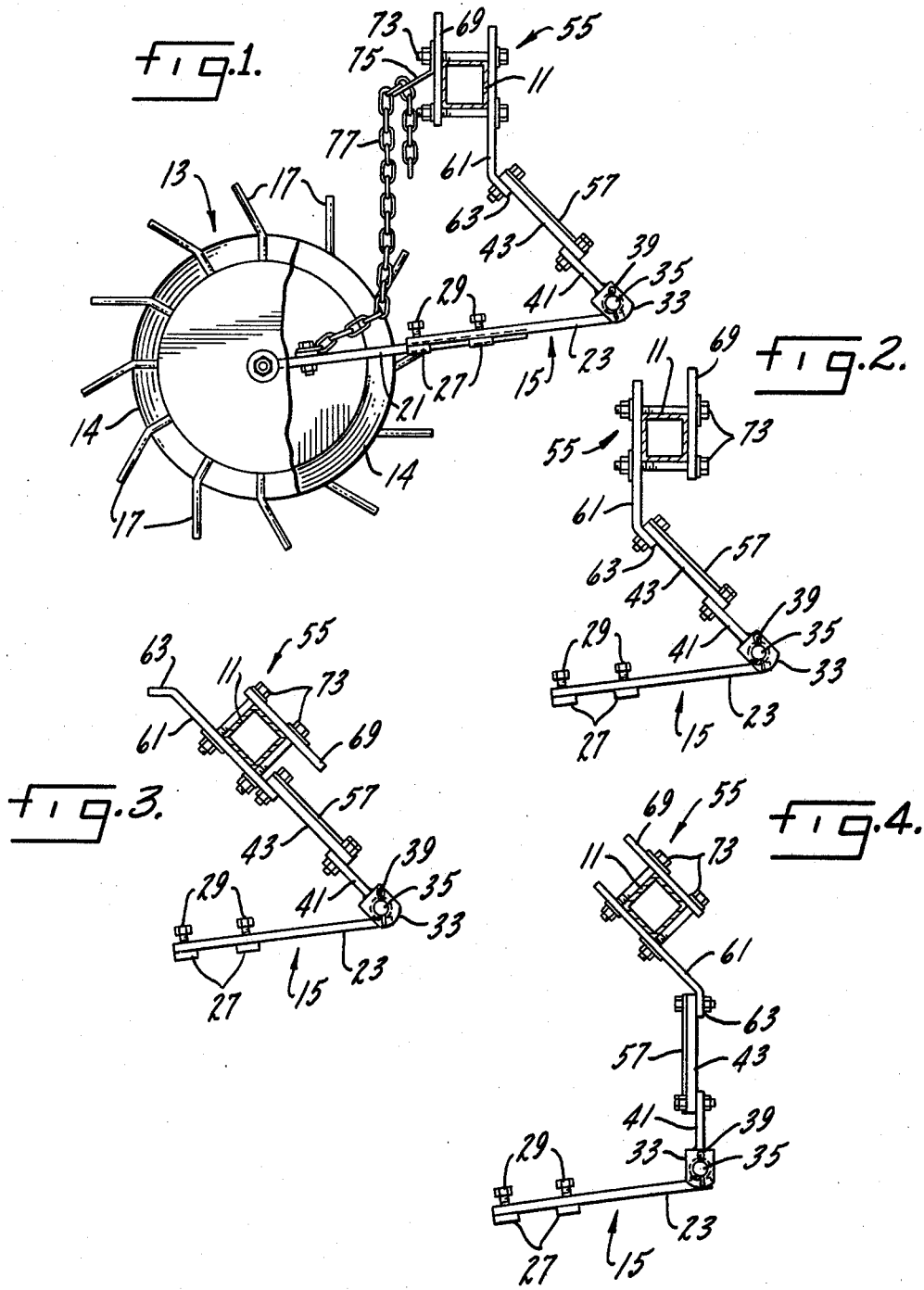
INVENTOR.
Edward Coats,
BY Parker & Carter
Attorneys.

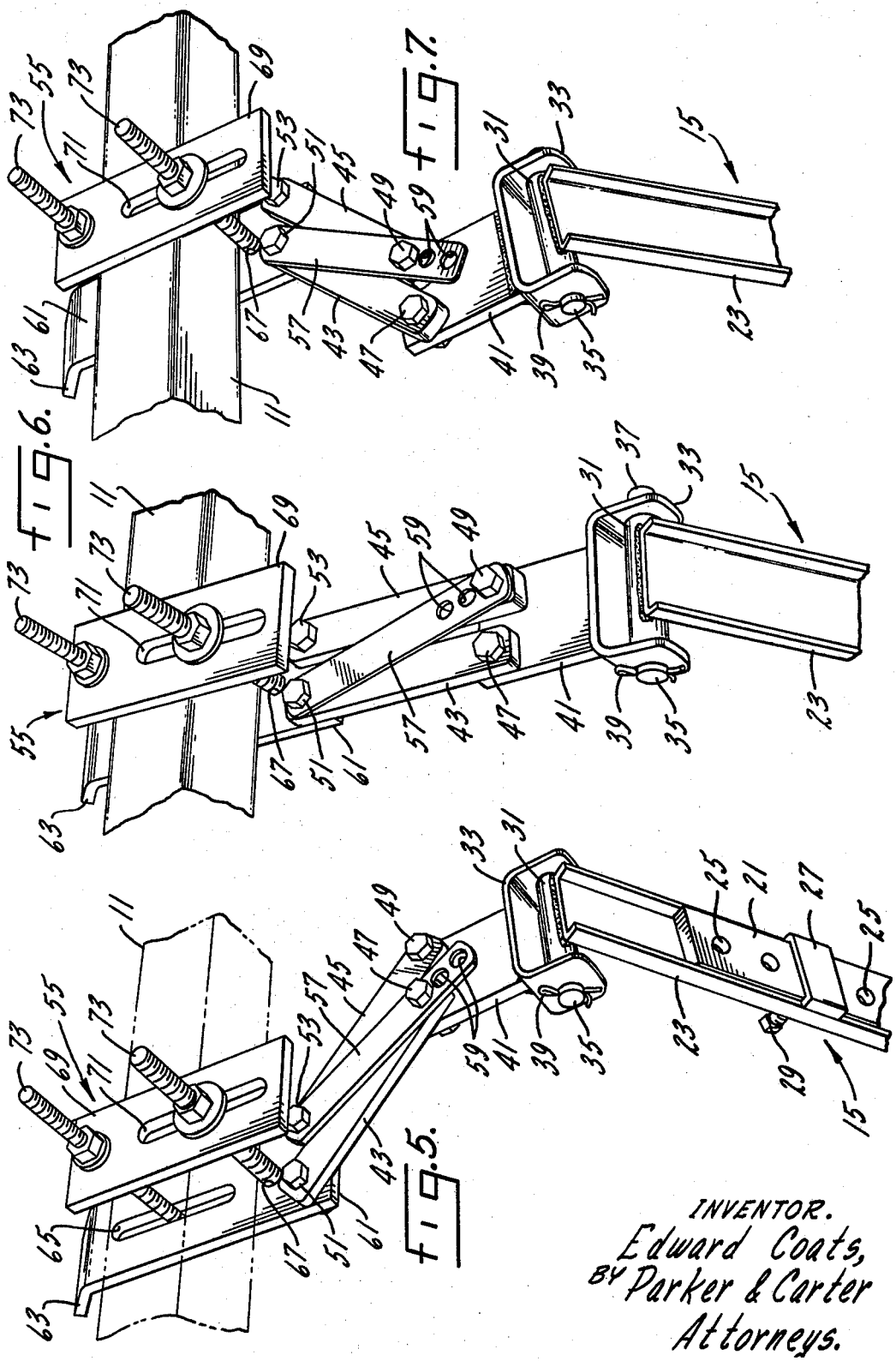

United States Patent Office 3,502,157
Patented Mar. 24, 1970

3,502,157
UNIVERSAL MOUNTING FOR TOOLS
Edward Coats, Sac City, Iowa, assignor to Noble Manufacturing Company, Sac City, Iowa, a corporation of Iowa
Filed Aug. 8, 1967, Ser. No. 659,128
Int. Cl. A01b 23/06, 21/08, 35/28
U.S. Cl. 172—741                                   4 Claims

ABSTRACT OF THE DISCLOSURE

A universal mounting for attachment of a ground engaging implement to a tool bar of a cultivator including a clamp means for connection to the tool bar which includes a pair of plates and a pair of threaded fastener means, a pair of elongated rigid links each of which is rotatably attached at one of its ends to the clamp member and extends therefrom in parallel relationship to one another, a pivot pin journal member attached to the opposite ends of the elongated rigid links, a locking strap extending from one end of one elongated rigid link to the opposite end of the other elongated rigid link and an implement arm affixed to a pivot rod journalled in said journal member.

SUMMARY OF THE INVENTION

This invention is directed to a universal mounting for attachment of a ground engaging implement such as a rolling cultivator shield to the tool bar of a cultivator and more particularly to such a universal mounting which is attachable to either a flat set or diamond set tool bar to position the implement either in line with or offset relative to the clamping means which connects to the tool bar.

An object of this invention is a universal mounting for a ground engaging implement which may be attached to any one of a variety of tool bars.

Another object is a universal mounting for a ground engaging implement which is easily adjustable to position the implement either in line or offset relative to the clamping means which is connected to the tool bar.

Another object is a universal mounting for a ground engaging implement which permits horizontal and vertical adjustment of the implement relative to the tool bar.

Another object is a universal mounting for a ground engaging implement which may be attached to either front mounted or rear mounted cultivators.

Other objects may be found in the following specification, claims and drawings.

BRIEF DESCRIPTION OF THE DRAWINGS

The invention is illustrated more or less diagrammatically in the following drawings wherein:

FIGURE 1 is a side elevational view of the invention attached to a tool bar which is shown in cross-section with some parts broken away and others omitted for clarity;

FIGURE 2 is a partial side elevational view similar to that of FIGURE 1, but showing a modified manner of attaching the invention to a tool bar;

FIGURE 3 is a view similar to that of FIGURE 2, but showing another modified manner of attaching the invention to a tool bar;

FIGURE 4 is a view similar to that of FIGURE 3, but showing yet another manner of attaching the invention to a tool bar;

FIGURE 5 is a partial perspective view of the invention connected to a tool bar shown in phantom and arranged for offset positioning of the ground engaging implement;

FIGURE 6 is a partial perspective view of the invention connected to a tool bar and arranged for in line positioning of the ground engaging implement; and FIGURE 7 is a view similar to that of FIGURE 5, but arranged for offset positioning of the ground engaging implement to the opposite side.

DESCRIPTION OF THE PREFERRED EMBODIMENT

A preferred embodiment of the invention is shown in the drawings. Referring to FIGURE 1 thereof, the numeral 11 indicates a hollow tool bar of generally rectangular cross-section which may be mounted on a farm machine such as a cultivator which is not shown. The tool bar may also support ground working implements such as shovels but these also are not shown. The invention of this application is intended to mount ground engaging implements such as a rolling cultivator shield 13 on the tool bar to position it between adjacent shovels. The cultivator shield includes discs 14 which are pivotally mounted to the lower end of a support arm 15 and may be equipped with teeth 17.

The support arm 15 includes a flat elongated member 21 to which the cultivator shield discs are pivotally attached at the lower end thereof and an elongated member 23 of channel cross-section (FIGURE 5) which is adapted to receive the flat elongated member 21 in a telescoping manner. A series of openings 25 (FIGURE 5) are formed in the flat member 21 along the length thereof. A plurality of U-shaped bars 27 (FIGURE 5), in this case two, are fastened to the channel-shaped member 23 across the open side thereof to function as supports for the flat piece 21. Threaded openings (not shown) are formed in the channel-shaped member opposite to these U-shaped bars and set screws 29 are threaded therein to fit through the openings 25 in the flat piece to lock the flat piece in telescoping relationship to the channel-shaped member.

As can be most clearly seen in FIGURES 5 and 6, a tube 31 (FIGURE 5) is welded to the member 23 of channel cross-section at the upper end thereof. This tube is received between the ends of a U-shaped member 33 and a pivot rod 35 having a headed portion 37 at one end thereof and an opening to receive a cotter pin 39 at the other end thereof extends through the tube to pivotally connect the arm 15 to the U-shaped member. A flat plate 41 extends from the outside of the bite portion of the U-shaped member and this plate has a pair of spaced openings (not shown) located at the free end thereof.

A pair of flat elongated rigid links 43 and 45 are each pivotally connected to the plate 41 by means of threaded fasteners 47 and 49 each of which extends through an opening (not shown) located adjacent an end of one of the rigid links and through one of the openings at the free end of the plate 41. Another opening is located in the opposite end of each of the rigid links 43 and 45 and threaded fasteners 51 and 53, respectively, extend through these openings to connect these links to a clamp means 55 which engages the tool bar 11. A locking strap 57 having a single opening (not shown) at one end and a plurality of openings 59 at the opposite end thereof is adapted to extend between the opposite ends of the adjacent rigid links 43 and 45 and to hold these links in a fixed relationship. One of the threaded fasteners 51, 53 is received in the single opening at one end of the strap and one of the threaded fasteners 47, 49 is received in one of the openings 59 at the opposite end of the strap. The provision of this link prevents pivoting of the links relative to the clamping means 55 and to the plate 41.

The clamping means 55, as is seen most clearly in FIGURE 5, includes a generally flat rectangular plate 61 having a bent portion 63 extending obliquely to the plate. A pair of openings (not shown) are located in the flat end of the plate 61 and a pair of openings (not shown) are located in the bent portion 63 with both sets of openings adapted to receive the threaded fasteners 51 and 53. A longitudinally extending elongated slot 65 and an opening 67 are formed in the plate 61. A second flat rectangular plate 69 having an opening (not shown) and an elongated slot 71 extending longitudinally thereof is also provided. A pair of threaded fasteners 73 to clamp the plates 61 and 69 against the tool bar 11 complete the clamp means 55. A chain support bracket 75 may be attached to one of the threaded fasteners 73. A chain 77 may be attached to this bracket and to the support arm 15.

The use, operation and function of this invention are as follows:

The universal mounting of this invention is intended for attaching a ground engaging implement such as a rolling cultivator shield to the tool bar of a tractor. A tool bar may be mounted either on the front or on the rear of a tractor and may be either set flat or set diamond. Because of spacing problems, it is desirable to be able to offset the clamping means which attaches the ground engaging implement to the tool bar along the length of the tool bar relative to the ground engaging implement. The universal mounting of this invention satisfies the above requirements with a single unit.

For example, if, as shown in FIGURE 1, the tool bar 11 is set flat, the plate 61 of the clamping means 55 may be attached to the tool bar against the front surface thereof with its obliquely bent portion 63 extending downwardly and forwardly. The links 43 and 45 are fastened to this bent portion by the fasteners 51 and 53. It should be noted that the bent portion extends from the main plate at a 45 degree angle.

Depending on the size and shape of the tool bar 11 and the location desired for the rolling cultivator shield 13 relative to the tool bar, it is also possible to mount the clamping means 55 in the manner shown in FIGURE 2 in which the plate 61 is positioned against the rear surface of the flat set tool bar with the obliquely bent portion 63 again extending downwardly and forwardly. The links 43 and 55 are connected to the obliquely bent portion.

If the tool bar 11 is set diamond in the manner shown in FIGURE 3, the clamping means 55 may be arranged with the plate 61 positioned against the downwardly and rearwardly surface of the tool bar with its bent portion 63 extending upwardly and rearwardly. In this configuration, the links 43 and 45 are attached to the end of the plate 61 opposite to the end having the bent portion 63.

If the desired position of the cultivator shield 15 is such that the links 43 and 45 should extend vertically with a tool bar which is set diamond, as shown in FIGURE 4, the plate 61 may be clamped against the lower and rearward surface of the tool bar 11 with its bent portion 63 extending downwardly. The links 43 and 45 are fastened to the bent portion 63 of plate 61.

When it is desired to align the rolling cultivator shield 13 with the clamping means 55, the links 43 and 45 may be positioned in the manner shown in FIGURE 6 and the lock strap 57 will extend between one end of one link and the opposite end of the other link with the fastener 49 extending through the opening 59 in the strap which is located closest to the end of the strap.

If the support arm 15 is to be positioned to the right or left of the clamping means 55, as shown in FIGURES 5 and 7, for example, because of obstructions from other tools mounted on the tool bar 11, the links 43 and 45 may be rotated together about the fasteners 51 and 53 to their desired position and the lock strap 57 may be fastened to the ends of opposite links to lock the links in the desired positions. The provision of a plurality of openings 59 at one end of the locking strap 57 permits it to be secured across the ends of the links with the links in a variety of positions.

The provision of a slot 65 and an opening 67 in the clamping plate 61 and a slot 71 and an opening in the clamping plate 69 along with the use of threaded fasteners 73 to hold these plates together permits the clamping means 55 to be attached to a variety of tool bars of different sizes and shapes.

The chain 77 is utilized to prevent the support arm 15 and cultivator shield 13 from dropping below a desired level when the tool bar 11 is raised above its normal operating position as occurs in a tractor rear mounted cultivator. When a front mounted cultivator is used, in which the tool bar is not moved, it is necessary to provide a chain lift arm (not shown) which is attached to the power shaft and which lifts the support arm 15 as the tool shaft is rotated to lift the ground engaging implements out of contact with the ground.

While a preferred form of the invention utilizing the universal mounting to support a rolling cultivator shield has been shown and described, it should be understood that this universal mounting may be used on other types of ground engaging implements and that many modifications and changes may be made thereto by one skilled in the art.

I claim:

1. A universal mounting for attachment of a ground engaging implement to a tool bar including:
    a clamp fastenable to the tool bar,
    said clamp including a pair of elongated plates and a pair of threaded fastening means with each plate having a circular opening to receive one of said threaded fastening means and an elongated slot to receive another of said fastening means, said plates being adjustable relative to each other including a first position in which the circular opening of one plate is aligned with the elongated slot of the other plate, and a second position in which the circular openings and the elongated slots of the plates are respectively aligned,
    a pair of elongated rigid links each of which is rotatably connected at one of its ends to one of said plates and extends therefrom,
    a ground engaging implement support means rotatably connected to the opposite ends of said elongated rigid links, said rigid links arranged in spaced, parallel relationship, and
    a rigid cross strap connected to one end of one rigid link and to the opposite end of the other rigid link to adjustably lock the rigid links against rotation about their connections to the clamp and to the ground engaging implement support means.

2. The structure of claim 1 further characterized in that one of said plates has an obliquely extending portion at one end thereof with said portion having means for rotatable connection of said links thereto.

3. The structure of claim 1 further characterized in that openings are provided in the ends of said rigid links and in the ends of the rigid strap and pairs of openings are provided in said clamp and in said implement support means to receive threaded fastening means to connect the links and strap to the clamp and implement support means.

4. The structure of claim 3 further characterized in that a plurality of openings are provided in said rigid strap and spaced along a portion of the length of the strap extending from one end thereof.

References Cited

UNITED STATES PATENTS

| | | | |
|---|---|---|---|
| 884,164 | 4/1908 | Jordan | 172—763 X |
| 1,124,106 | 1/1915 | Buffalow | 172—743 X |
| 1,168,202 | 1/1916 | Haskett et al. | 172—741 X |
| 3,389,754 | 6/1968 | Allison | 172—484 X |

ROBERT E. PULFREY, Primary Examiner

S. C. PELLEGRINO, Assistant Examiner

U.S. Cl. X.R.

172—763; 306—1.5